(12) United States Patent
Chakraborty et al.

(10) Patent No.: US 10,523,756 B1
(45) Date of Patent: Dec. 31, 2019

(54) NETWORK SERVICE FOR IDENTIFYING INFREQUENTLY ACCESSED DATA IN A DATA STREAM

(71) Applicant: Amazon Technologies, Inc., Seattle, WA (US)

(72) Inventors: Anand Chakraborty, Redmond, WA (US); Michael Christopher Wenneman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 359 days.

(21) Appl. No.: 15/446,774

(22) Filed: Mar. 1, 2017

(51) Int. Cl.
*G06F 15/173* (2006.01)
*H04L 29/08* (2006.01)
*G06F 3/06* (2006.01)
*H04L 29/06* (2006.01)
*G06N 20/00* (2019.01)

(52) U.S. Cl.
CPC .......... *H04L 67/1097* (2013.01); *G06F 3/067* (2013.01); *G06F 3/0611* (2013.01); *G06F 3/0653* (2013.01); *G06F 3/0655* (2013.01); *G06N 20/00* (2019.01); *H04L 65/601* (2013.01); *H04L 67/16* (2013.01)

(58) Field of Classification Search
CPC ... H04L 67/1097; H04L 67/16; H04L 65/601; G06N 20/00; G06F 3/0611; G06F 3/0655; G06F 3/067; G06F 3/0653
See application file for complete search history.

(56) References Cited

U.S. PATENT DOCUMENTS

| | | | | |
|---|---|---|---|---|
| 2002/0075319 A1* | 6/2002 | Hochmuth | .......... | G06F 3/04817 715/810 |
| 2006/0218499 A1* | 9/2006 | Matthews | ............. | G06F 16/313 715/765 |
| 2008/0140347 A1* | 6/2008 | Ramsey | .................. | G06F 17/18 702/180 |

OTHER PUBLICATIONS

NPL via google search, "Approximate Heavy Hitters and the Count-Min Sketch", Mar. 2016 (Year: 2016).*
"Streaming algorithm", downloaded Mar. 1, 2017, available at https://en.wikipedia.org/wiki/Streaming_algorithm, 10 pages.

* cited by examiner

*Primary Examiner* — Padma Mundur
(74) *Attorney, Agent, or Firm* — Lee & Hayes, P.C.

(57) ABSTRACT

A stream of storage requests can be received for data objects stored by a storage service. A streaming algorithm can be utilized to identify the most frequently accessed objects stored by the storage service. A statistical distribution of the most frequently accessed objects can then be generated and utilized to estimate the number of infrequently accessed objects. Machine learning can also be utilized to identify correlations between attributes of objects stored by the storage service and their associated access rates. For instance, machine learning can be utilized to determine that objects stored in a certain location or having other characteristics typically have low access rates. Information regarding the number of infrequently accessed objects and their learned attributes can be utilized to take action with regard to the infrequently accessed objects, such as moving the infrequently accessed objects to long-term storage.

20 Claims, 8 Drawing Sheets

NETWORK SERVICE FOR IDENTIFYING INFREQUENTLY ACCESSED DATA IN A DATA STREAM

BACKGROUND

Network-based storage services exist that allow data to be stored and accessed over wide area networks ("WANs"), such as the internet. Some network-based storage services (or an associated service, such as a storage analytics service) provide functionality for providing metrics and/or analytics for objects stored by the network service. For example, metrics can be periodically generated indicating the access rates for objects, the volume of data uploaded or downloaded, the error rates associated with stored objects, and/or other types of metrics. Various types of analytics can also be generated for the stored objects based upon the metrics and/or other information.

One type of information that is very difficult to compute for large scale storage services such as those described above is the identity of stored data objects that are infrequently or never accessed. This is difficult because requests for these types of objects are infrequently or never received at the storage service and, therefore, no data is available regarding the last time that these objects were accessed. The storage of data that is infrequently or never accessed can unnecessarily consume valuable storage space, thereby degrading the performance of the storage services that store such data.

The disclosure made herein is presented with respect to these and other considerations.

DETAILED DESCRIPTION

Figure 1:
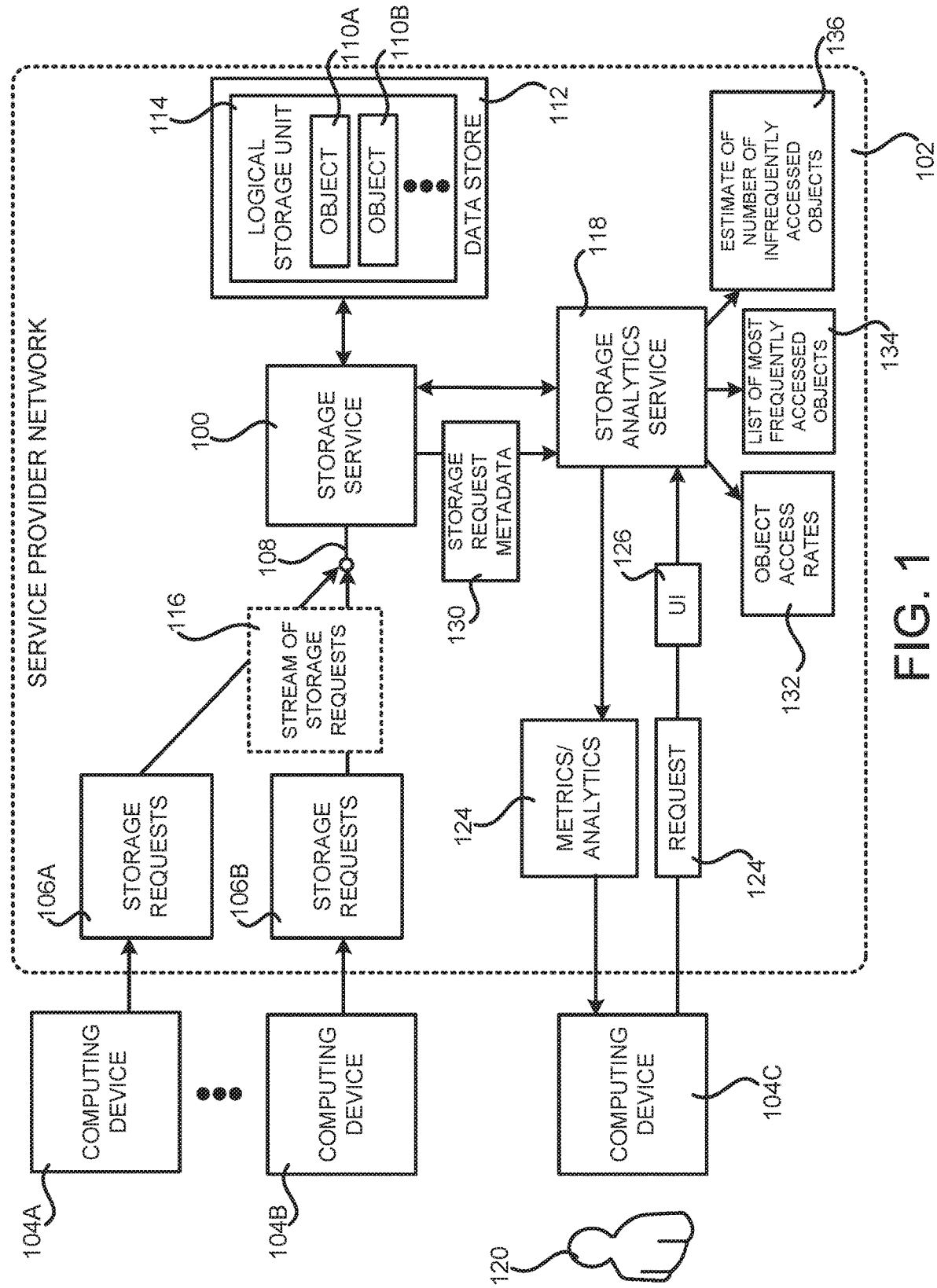
FIG. 1 is a software and network architecture diagram showing aspects of the operation of a storage analytics service configured to provide functionality for identifying infrequently accessed data from a data stream, according to one particular configuration.

The following detailed description is directed to technologies for identifying infrequently accessed data from a stream of requests for the data. Through an implementation of the disclosed technologies, a network service can be implemented that is capable of estimating the number of infrequently accessed objects from a stream of requests for the objects. The network service is also capable of using machine learning or other technologies to identify correlations, or inferences, between object request rates and object attributes. The data identifying the number of stored but infrequently accessed objects and their associated attributes can then be utilized to take various types of actions with respect to the data objects. For example, and without limitation, the infrequently accessed data objects might be deleted or moved to long-term storage, thereby improving the performance of the storage service and, potentially, other related services. Technical benefits other than those specifically mentioned herein can also be realized through an implementation of the disclosed technologies.

In order to provide the functionality described above, a storage service is configured to store data objects and to receive and process a stream of storage requests (e.g. reads, writes, or other types of accesses) for the data objects. The storage service can also generate storage request metadata that describes the requests in the stream of storage requests. The storage request metadata can be provided to a storage analytics service for use in generating metrics and/or analytics, such as data identifying the number of infrequently accessed data objects and their attributes.

Using a streaming algorithm, such as a "heavy hitters" algorithm, the storage analytics service (or another related service like the storage service itself) can generate an estimate of the most frequently accessed objects (e.g. the top N most frequently accessed objects) stored by the storage service. A streaming algorithm like the "heavy hitters" algorithm can generate an approximation of the most frequent items in a data stream (e.g. the objects referenced by a stream of storage requests). This approximation can be generated using the storage request metadata that describes the stream of storage requests received at the storage service. This approximation can be limited to those objects stored by a particular user or group of users of the storage service.

Once the estimate of the most frequently accessed objects has been generated, a statistical distribution of the most frequently accessed objects can be created. For example, and without limitation, a histogram can be generated for the most frequently accessed data objects and their associated access rates. Utilizing the statistical distribution of the most frequently accessed data objects, an estimate can be made of the number of infrequently accessed objects. An infrequently accessed data object is an object that is not among the most frequently accessed objects (e.g. the top N most frequently accessed objects) and that has an associated access rate between a first value (which might be referred to herein as a "lower bound") and a second value (which might be referred to herein as an "upper bound"). In some configurations, the storage analytics service, or another service, can receive the first and second values for use in identifying the number of infrequently accessed objects via a network service application programming interface ("API"), a graphical user interface ("GUI") or in another manner.

A request can also be received (e.g. via an API or GUI) for data identifying the estimated number of objects stored by the storage service that are infrequently accessed. In some configurations, the request specifies the upper and lower bounds to be utilized in identifying the estimate of the number of infrequently accessed objects. Responsive to such a request, the number of infrequently accessed data objects stored by the storage service having associated access rates between the lower and upper bounds can be estimated based upon the statistical distribution generated for the frequently accessed data objects and an indication of the total number of stored objects. In some configurations, a prior probability distribution (e.g. a Bayesian prior) of access rates for objects stored by the storage service can be maintained. Learned correlations between object attributes and access rates (described below) can then be utilized to influence the prior probability distribution of access rates in order to estimate the number of infrequently accessed data objects.

In some configurations, the storage analytics service (or another service like the storage service) can also utilize machine learning or other technologies to identify correlations between access rates for stored data objects and one or more attributes of the objects. For example, and without limitation, the storage analytics service can identify correlations between object access rates and object types, object storage locations, user agent strings, object ages, object sizes, object names, or user-supplied metadata associated with the objects.

Once the correlations have been identified, object attributes that are positively correlated to access rates between an upper and lower bound can be identified for a group of infrequently accessed objects. The identified attributes can also be returned in response to a request for data identifying an estimated number of infrequently accessed objects. The data identifying the number of stored infrequently accessed objects and their associated attributes can then be utilized to take various types of actions with respect to the infrequently accessed data objects. For example, and without limitation, the infrequently accessed data objects might be deleted or moved to long-term storage, thereby improving the performance of the storage service and, potentially, other related services. Additional details regarding the various components and processes described briefly above for identifying infrequently accessed data from a stream of requests for the data will be presented below with regard to FIGS. 1-7.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software and network architecture diagram showing aspects of the operation of a storage service 100 and an associated storage analytics service 118 configured to provide functionality for identifying infrequently accessed data from a data stream, according to one particular configuration. As shown in FIG. 1, the storage service 100 and the storage analytics service 118 operate in a service provider network 102 in one particular configuration.

The service provider network 102 is a computing network configured to provide computing resources (which might be referred to simply as "resources") on a permanent or an as-needed basis. Among other types of functionality, the computing resources provided by the service provider network 102 can be utilized to implement various types of network services. The computing resources provided by the service provider network 102 can include data processing resources like data storage resources, virtual machine ("VM") instances, networking resources, data communication resources, network services, and other types of computing resources.

A user of the service provider network 102, such as the user 120, can utilize an appropriate computing system, such as the computing device 104C, to communicate with the service provider network 102 over an appropriate data communications network (not shown in FIG. 1). In this way, a user of the service provider network 102 can configure various aspects of the operation of the computing resources provided by the service provider network 102, or to otherwise control any computing resources being utilized by the user 120.

For example, and without limitation, a computing system 104C utilized by a user 120 of the service provider network 102 can be utilized to purchase computing resources in the service provider network 102, to configure aspects of the operation of the computing resources, to access and utilize functionality provided by the various services and systems described herein, and/or to perform other types of functionality with regard to the operation of the computing resources provided by the service provider network 102.

The computing devices utilized to configure and monitor the resources in the service provider network 102 (e.g. the computing device 104C) can be any type of computing device capable of connecting to the service provider network 102 via a suitable data communications network such as, but not limited to, a laptop or desktop computer, a tablet computing device, a server computer, or a smartphone.

Administrative users employed by the owner or operator of the service provider network 102, such as administrators managing the operation of the service provider network 102, can also connect with, manage, and utilize resources provided by network services executing within the service provider network 102 in a similar fashion. Additional details regarding the configuration and operation of the service provider network 102 will be provided below with regard to FIGS. 4-7.

As discussed briefly above, the service provider network 102 can be configured to execute various types of network services. For example, and without limitation, the service provider network 102 can execute the storage service 100, an associated storage analytics service 118, and other network services, some of which are described in greater detail below with regard to FIG. 6. Other network services can provide different types of computing resources and/or functionality. In this regard, it should be appreciated that the network services and the respective computing resources that each provides are merely illustrative and that other types of network services can provide other types of computing resources and functionality in other configurations.

The storage service 100 can provide logical storage units 114 that are accessible to the computing devices 104, to VM instances provided by an on-demand computing service (not shown in FIG. 1) executing in the service provider network 102, and to other computing devices. In order to provide this functionality, the storage service 100 can include software and computing resources that collectively operate to store objects 110A-B (which might be referred to herein as "data objects") using block or file-level storage devices (and/or virtualizations thereof), which might be referred to herein collectively as a data store 112.

As shown in FIG. 1, the logical storage units 114 provided by the storage service 100 can, for example, be accessed by the computing devices 104. In the example shown in FIG. 1, for instance, the computing devices 104A and 104B are issuing storage requests 106A and 106B, respectively, to the logical storage unit 114. The storage requests 106 can be read requests, write requests, copy requests, transform requests, copy requests, delete requests, update requests, transfer requests, range get requests, or other types of requests for interacting with all or a portion of the objects 110 stored on the logical storage unit 114. Together, the storage requests 106A and 106B can be considered a stream 116 (which might be referred to herein as a "data stream") of storage requests 106. As also shown in FIG. 1, the storage service 100 can expose a network services application programming interface ("API") 108 for receiving and responding to the storage requests 106.

The storage service 100 allows objects 110 to be stored and accessed at a location identified by a prefix, which defines a location at which objects 110 can be stored and accessed through a network-based storage service. A prefix 116, for example, can identify a storage container or another type of logical storage unit 114 provided by the storage service 100, and a location within a nested folder structure where objects 110 can be stored (e.g. "container_name:/foo/bar/"). Stored objects 110 can be accessed (e.g. read from, written to, or deleted) using the prefix and the name of the object 110 (e.g. "container_name:/foo/bar/object1.png"). Terms other than prefix, such as "path", might also be utilized to refer to the location at which objects 110 can be stored by a network-based storage service, such as the storage service 100.

The storage service 100, or an associated service such as the storage analytics service 118 in the configuration shown in FIG. 1, can also provide functionality for generating and providing metrics and analytics 124 for stored objects 110. For example, metrics can be periodically generated indicating the access rates for stored objects 110 (shown in FIG. 1 as the object access rates 132), the volume of data uploaded or downloaded, the error rates associated with stored objects 110, and/or other types of metrics. The storage service 100 or another service, such as the storage analytics service 118, can generate various types of analytics for the stored objects 110 based upon the metrics and/or other information. Network services APIs can also be exposed by the storage service 100 or the storage analytics service 118 for accessing the metrics and analytics 124.

As described briefly above, one type of information that is very difficult to compute for large scale storage services 100, such as those described above, is the identity of stored data objects 110 that are infrequently or never accessed. This is difficult because requests 106 for these objects are infrequently or never received in the stream 116 of storage requests 116 and, therefore, no or little data is available regarding the last time that these objects 110 were accessed. The storage of data objects 110 that are infrequently or never accessed can unnecessarily consume valuable storage space, thereby degrading the performance of computing systems that provide the storage service 100 and, potentially, other related systems and services.

In order to address this and potentially other considerations, the storage analytics service 118 provides functionality for estimating the quantity of infrequently accessed objects 110 stored by the storage service 100 on behalf of a user or group of users from an analysis of the stream 116 of storage requests 106. The storage analytics service 118 can also provide functionality for using machine learning or other technologies to identify correlations, or inferences, between the object request rates 132 and attributes of the stored objects 110.

The data identifying the estimated quantity of infrequently accessed objects 110 and their associated attributes can then be utilized to take various types of actions with respect to the data objects 110. For example, and without limitation, the infrequently accessed data objects 110 might be deleted or moved to long-term storage, thereby improving the performance of the storage service 110 and/or related systems and services. Additional details regarding this functionality are provided below.

In order to enable the functionality described above, the storage service 100 can generate storage request metadata 130 that describes the requests 106 in the stream 116 of storage requests 106. The storage request metadata 130 can be provided to the storage analytics service 118 for use in generating the metrics/analytics 124, such as an estimate 136 of the quantity of infrequently accessed data objects 110 stored by the storage service 100 and their correlated object attributes.

Using a streaming algorithm and object access rates 132 for the stored objects 110, the storage analytics service 118 (or another related service like the storage service itself) can generate a list 134 that provides an estimate of the most frequently accessed objects 110 (e.g. the top N most frequently accessed objects 110, where N is a positive integer) stored by the storage service 100. As known to those skilled in the art, streaming algorithms are algorithms for processing data streams in which the input (e.g. the storage request metadata 130 for the stream 116 of requests 106) is presented as a sequence of items and can be examined in only one or a few passes. These algorithms have limited memory available to them particularly as compared to the size of the input stream and also limited processing time per item. These constraints may mean that a streaming algorithm produces an approximate answer based on a summary or "sketch" of the data stream in memory.

In one particular configuration, the streaming algorithm is the "heavy hitters algorithm." As known to those skilled in the art, the "heavy hitters" algorithm can generate an approximation of the most frequent items in a data stream (e.g. the objects 110 referenced by the stream 116 of storage requests 106). This approximation can be generated using the storage request metadata 130 that describes the stream 116 of storage requests 106 received at the storage service 100. This approximation can be limited to those objects 110 stored by a particular user or group of users of the storage service 100 or those objects 110 stored in a particular location or group of locations. The number of objects 110 considered can also be limited in other ways in other configurations.

In this regard, it is to be appreciated that various implementations of the "heavy hitters" algorithm can be used in various configurations. For example, and without limitation, the Boyer-Moore majority vote algorithm, the Karp-Papadimitriou-Shenker algorithm, the Count-Min sketch algorithm, sticky sampling, lossy counting, sample and hold, multi-stage Bloom filters, the Count-sketch algorithm, or sketch-guided sampling can be utilized in various configurations. Other types of streaming algorithms might also be utilized to identify the most frequently accessed objects stored by the storage service 100 from the stream 116 of storage requests 106 in other configurations.

Once the list 134 of the most frequently accessed objects 110 has been generated, a statistical distribution (not shown in FIG. 1) of the most frequently accessed objects 110 can be created. For example, and without limitation, a histogram can be generated for the most frequently accessed data objects 110 and their associated access rates 132. One example histogram will be described for a statistical distribution below with regard to FIG. 3.

Utilizing the statistical distribution of the most frequently accessed data objects 110, an estimate 136 can be made of the number of infrequently accessed objects 110. As mentioned above, an infrequently accessed data object 110 is an object that is not among the most frequently accessed objects 110, and that has an associated access rate 132 between a lower bound (e.g. zero) and an upper bound (e.g. one). In some configurations, the storage analytics service 118, or another service, can receive the upper and lower bounds for use in identifying the number of infrequently accessed objects 110 via a network service API, a GUI 126, or in another manner.

A request 124 can also be received (e.g. via an API or GUI 126) for the estimate 136 of the number of objects 110 stored by the storage service 100 that are infrequently accessed. In some configurations, the request 124 specifies the upper and lower bounds to be utilized in identifying the estimate 136 of the number of infrequently accessed objects 110. Responsive to such a request 124, the number of infrequently accessed data objects 110 stored by the storage service 100 having associated access rates between the lower and upper bounds can be estimated based upon the statistical distribution generated for the frequently accessed data objects in the list 134 and an indication of the total number of stored objects 110.

In particular, and as described briefly above, in some configurations, the storage analytics service 118 maintains a prior probability distribution (e.g. a Bayesian prior) of access rates for objects 110 stored by the storage service. The learned correlations between object attributes and access rates (described in greater detail below) can then be utilized to influence the prior probability distribution of access rates in order to estimate the number of infrequently accessed data object 110. Other mechanisms can be utilized in other configurations.

As also discussed briefly above, in some configurations the storage analytics service 118 (or another service like the storage service 100) can also utilize machine learning or other technologies to identify correlations between access rates 132 for stored data objects 110 and one or more attributes of the objects 110. For example, and without limitation, the storage analytics service 118 can identify correlations between object access rates 132 and object types, object storage locations, user agent strings, object age, object size, object name, or user-supplied metadata associated with the objects.

Once the correlations have been learned or otherwise identified, attributes of the objects 110 that have been correlated to access rates 132 between the specified upper and lower bounds can be identified for a group of infrequently accessed objects 110. The identified attributes can also be returned in response to a request 124 for data identifying the estimate 136 of the number of infrequently accessed objects 110.

The data identifying the number of stored infrequently accessed objects 110 and their associated attributes can be utilized to take various types of actions with respect to the infrequently accessed data objects 110. For example, and without limitation, the infrequently accessed data objects 110 might be deleted or moved to long-term storage, thereby improving the performance of the storage service 100 and, potentially, other related services. Additional details regarding the mechanism described above with regard to FIG. 1 for identifying infrequently accessed data in a stream 116 of requests 106 will be provided below with regard to FIGS. 2A-7.

Figure 2A:
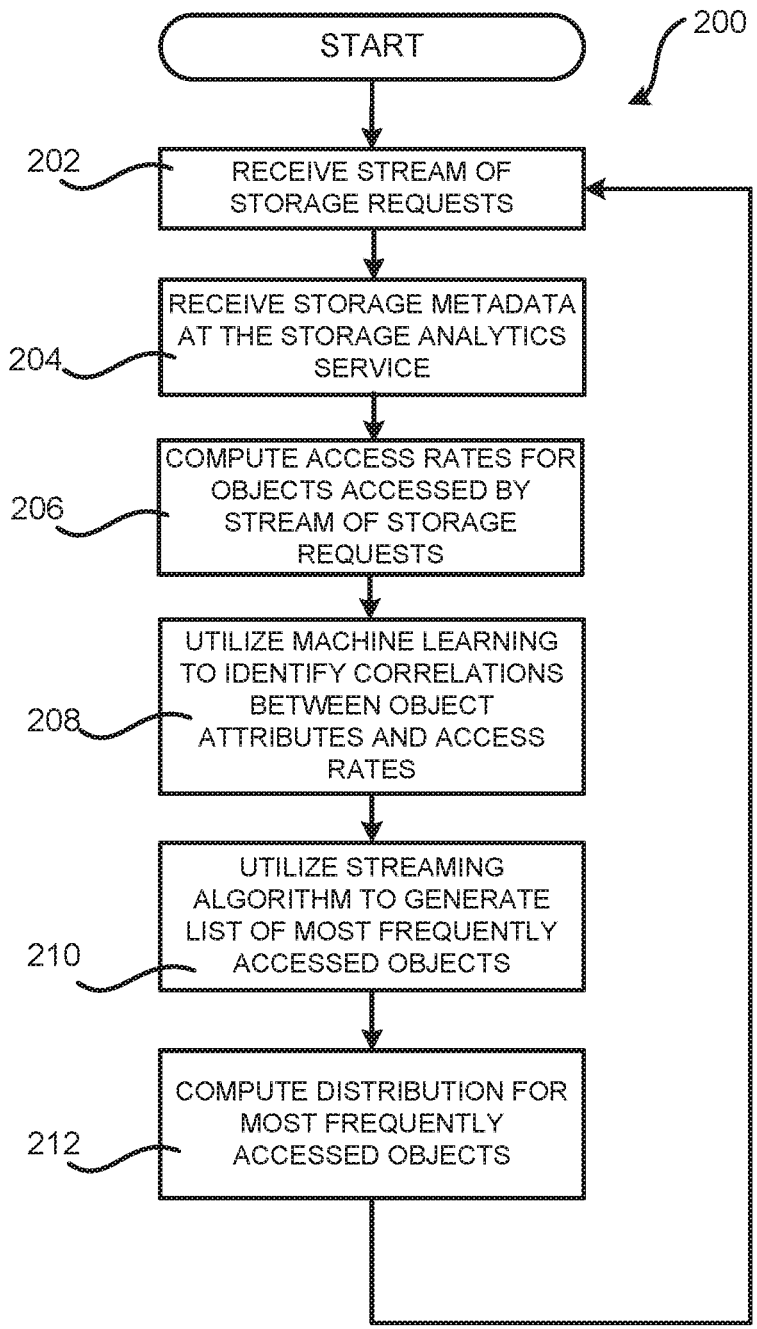
FIG. 2A is a flow diagram showing aspects of a routine for generating a list of the most frequently accessed objects in a data stream, and for generating a corresponding statistical distribution for the most frequently accessed objects, according to one particular configuration.

FIG. 2A is a flow diagram showing aspects of a routine 200 for generating a list 134 of the most frequently accessed objects 110 in a data stream 116, and for generating a corresponding statistical distribution for the most frequently accessed objects 110, according to one particular configuration. It should be appreciated that the logical operations described herein with respect to FIGS. 2A and 2B, and the other FIGS., can be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules.

These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 200 shown in FIG. 2A begins at operation 202, where the storage service 100 receives the stream 116 of storage requests 106. As discussed above, the storage service 100 can also generate storage request metadata 130 for the requests 106 in the stream 116 of storage requests 106. The storage service 100 provides the storage request metadata 130 to the storage analytics service 118 at operation 204. From operation 204, the routine 200 proceeds to operation 206.

At operation 206, the storage analytics service 118 (or another service) utilizes the storage request metadata 130 to compute access rates 132 for the objects 110 stored by the storage service 110. The access rates 132 might describe, for example, the number of storage requests 106 received for the objects 110 per second or other time period. The routine 200 then proceeds to operation 208, where the storage analytics service 118, or another service, utilizes supervised or unsupervised machine learning to identify correlations between the object access rates 132 and attributes of the objects 110. Some of the attributes for which correlations can be learned were identified above.

Figure 3:
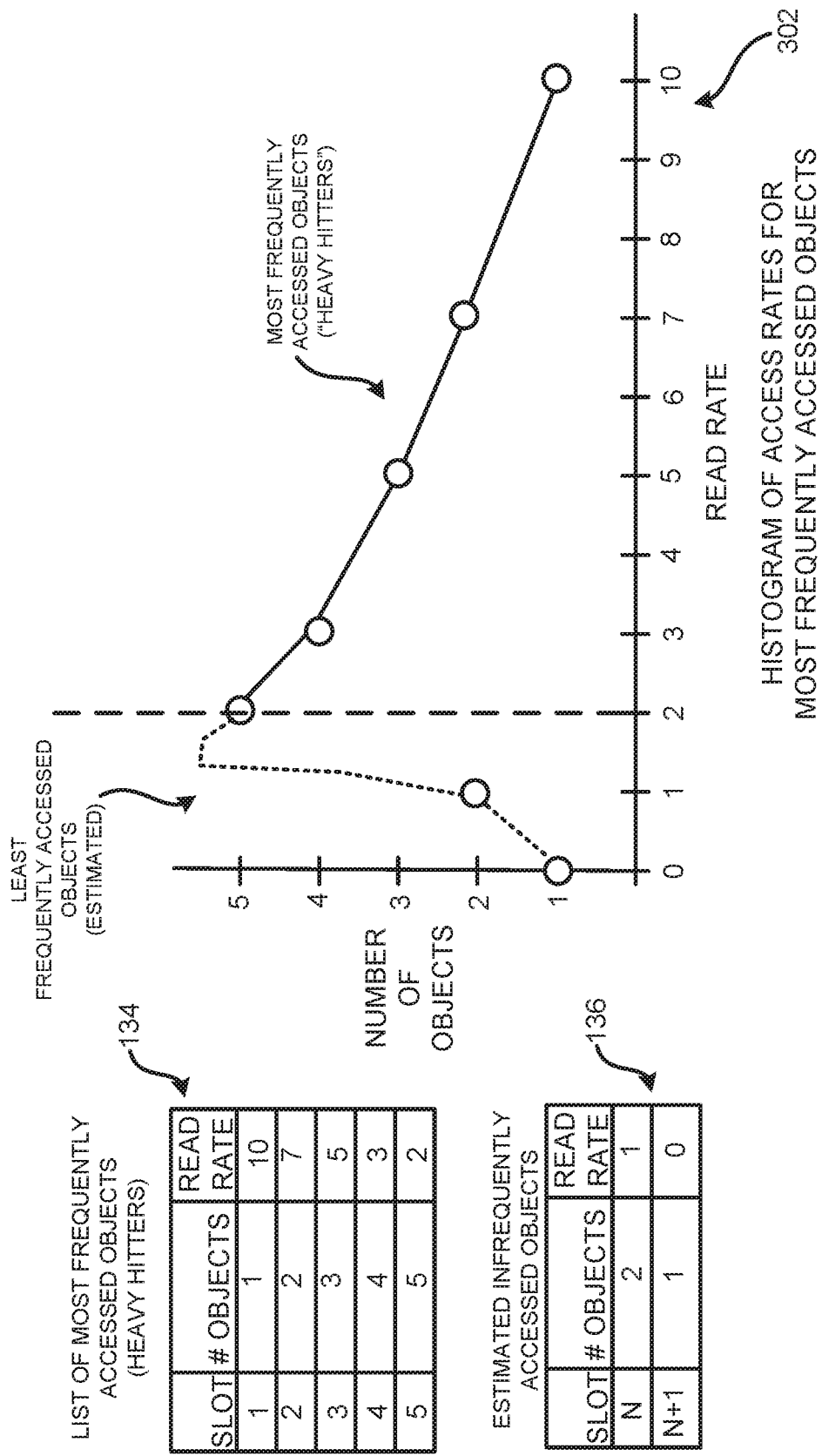
FIG. 3 shows a histogram that graphically illustrates an example statistical distribution computed for the most frequently accessed objects in a data stream using the routine shown in FIG. 2A, according to one particular configuration.

From operation 208, the routine 200 proceeds to operation 210, where the storage analytics service 118, or another service, utilizes a streaming algorithm, such as the "heavy hitters" algorithm, to generate the list 134 of objects 110 most frequently accessed in the stream 116 of storage requests 106. The routine 200 then proceeds from operation 210 to operation 212, where the storage analytics service 118 computes a statistical distribution for the objects 110 in the list 134 of most frequently accessed objects 110. An example histogram will be described below with regard to FIG. 3 showing a sample statistical distribution for an illustrative list 134 of most frequently accessed objects 110. From operation 212, the routine 200 proceeds back to operation 202, where the process described above can be repeated in order to maintain an updated statistical distribution for the list 134 of most frequently accessed objects 110.

Figure 2B:
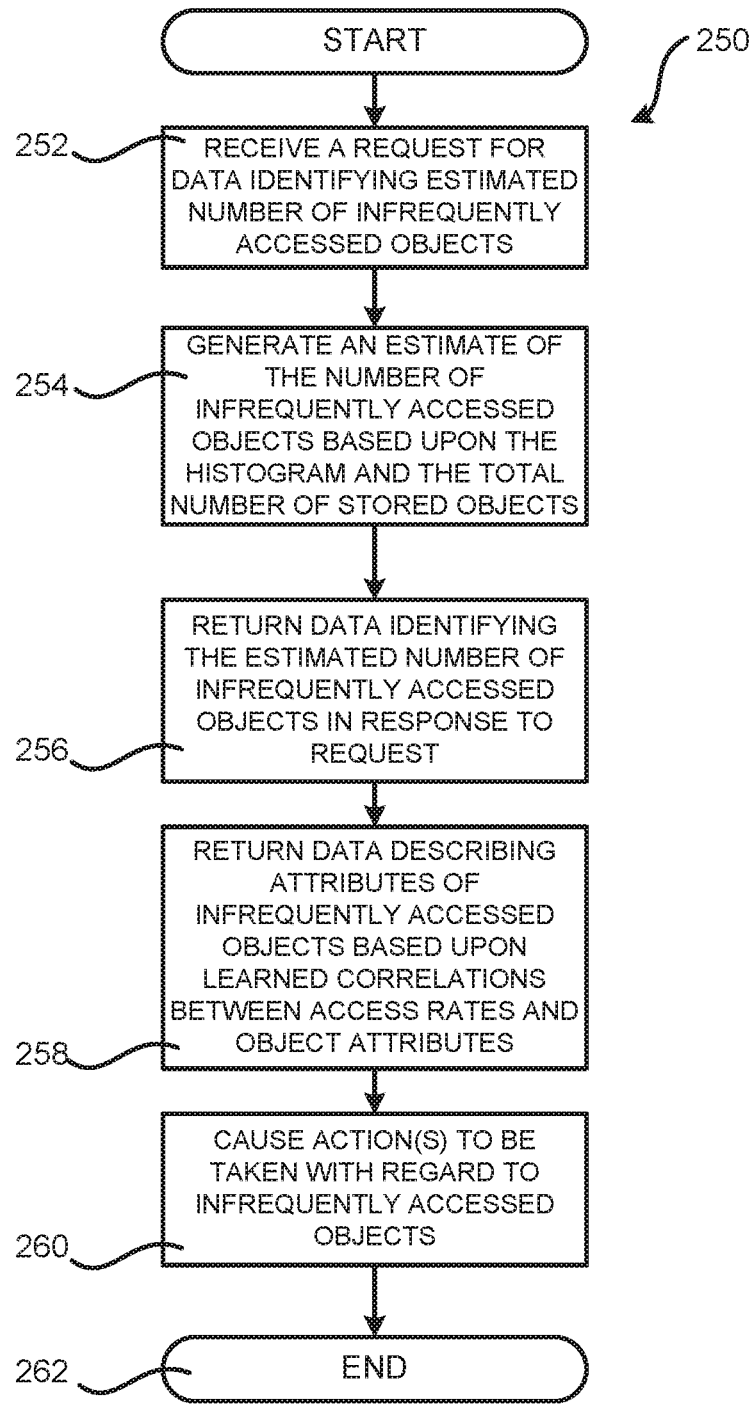
FIG. 2B is a flow diagram showing aspects of a routine for processing requests at a network service for estimates of the number of infrequently accessed objects stored by a storage service, according to one particular configuration.

FIG. 2B is a flow diagram showing aspects of a routine 250 for processing requests 124 at a network service, like the storage analytics service 118, for an estimate 136 of the number of infrequently accessed objects 110 stored by the storage service 100, according to one particular configuration. The routine 250 begins at operation 252, where the storage analytics service 118 receives a request 124 for an estimate 136 of the number of infrequently accessed objects 110 stored by the storage service 100. As discussed above, the request 124 can be received via an API, a GUI 126, or another suitable interface. As also discussed above, the request 124 can also specify upper and lower bounds for use in identifying the estimate 136 of the number of infrequently accessed objects 136. The request 124 can also include other information in other configurations.

From operation 252, the routine 250 proceeds to operation 254, where the storage analytics service 118 generates the estimate 136 of the number of infrequently accessed objects using the lower and upper bounds, the statistical distribution generated at operation 212 of the routine 200, and data identifying the total number of objects 110 stored by the storage service 110. Additional details regarding this process will be provided below with regard to FIG. 3.

From operation 254, the routine 250 proceeds to operation 256, where the storage analytics service 118 returns data identifying the estimate 136 of the number of infrequently accessed objects 110 in response to the request 124. In particular, the response 124 may be made to an API call, presented in the GUI 126, and/or in another manner.

From operation 256, the routine 250 proceeds to operation 258, where the storage analytics service 118 can also return data in response to the request 124 that describes attributes of the infrequently accessed objects 110. For example, and without limitation, the data might indicate that the infrequently accessed objects 110 are likely to be stored in a certain location and be of a certain type. This information can be used to identify the actual infrequently used objects 110.

From operation 258, the routine 250 proceeds to operation 260, where the storage analytics service 110, or another service, can cause various actions to be taken with regard to the infrequently accessed objects 110. For example, and without limitation, the infrequently accessed objects 110 might be deleted or moved to another storage service that provides long-term, or "cold", storage. The infrequently accessed objects 110 can also be utilized to infer or detect operational performance characteristics of the computing devices 104, used to detect fraud or other types of activities, and/or used to detect security issues with the computing devices 104. Other types of actions can be taken in other configurations. The routine 250 proceeds from operation 260 to operation 262, where it ends.

FIG. 3 shows a histogram 302 that graphically illustrates an example statistical distribution computed using the routine 200 shown in FIG. 2A, according to one particular configuration. In the example shown in FIG. 3, a list 134 of the most frequently accessed objects 110 has been generated that specifies the number of objects 110 having particular read rates. Specifically, one object 110 has a read rate of 10 reads per second, two objects 110 have a read rate of 7 reads per second, three objects 110 have a read rate of 5 reads per second, four objects have a read rate of 4 reads per second, and five objects 110 have a read rate of 2 reads per second. In this regard, it is to be appreciated that the list 134 has been simplified for illustration purposes and that the list 134 can include many more entries than shown in the example presented in FIG. 3.

As also shown in FIG. 3, a histogram 302 has been generated that illustrates the content of the list 134. In particular, the x-axis of the histogram 302 corresponds to read rate and the y-axis of the histogram 302 represents the number of objects 110 having a particular read rate. In this manner, a statistical distribution of the "heavy hitters" (i.e. the most frequently accessed objects 110) can be generated.

In order to generate the estimate 136 of the number of infrequently accessed objects 110, the "shape" of the curve between a lower bound (in this case zero) and an upper bound (in this case two) and the total number of objects (18 in this example) can be utilized to estimate the number of infrequently accessed objects 110. In this example, the estimate 136 of the number of infrequently accessed objects 110 indicates that there are two objects having a read rate of 1 read per second and one object having a read rate of zero.

As discussed briefly above, in some configurations, the storage analytics service 118 maintains a prior probability distribution (e.g. a Bayesian prior) of access rates for objects 110 stored by the storage service. The learned correlations between object attributes and access rates (described in greater detail below) can then be utilized to influence the prior probability distribution of access rates in order to estimate the number of infrequently accessed data object 110.

It is to be appreciated that while the configurations described herein are primarily presented in the context of determining an estimate 136 of the number of infrequently accessed objects 110 stored by the storage service 110, the techniques disclosed herein can be utilized to identify the number of objects 110 having other characteristics, or having other observable events taking place with respect thereto, in other configurations. For example, and without limitation, the mechanisms described above might be utilized to generate an estimate of the number of objects that have a size between a lower bound and an upper bound based upon a distribution of the largest objects 110 referenced by the storage requests 106 in the stream 116. Estimates of the number of stored objects 110 having other characteristics can be generated in other configurations.

Figure 4:
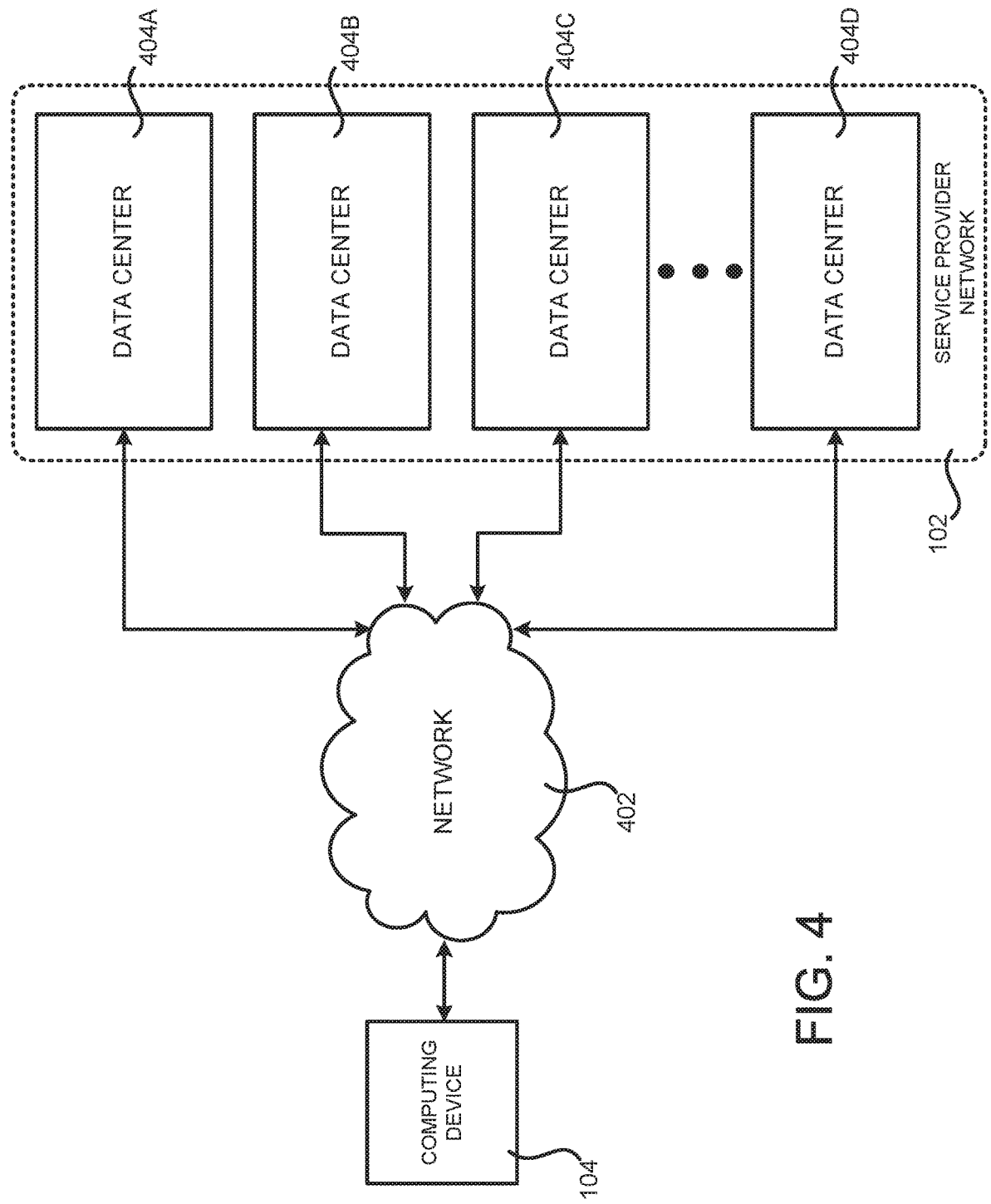
FIG. 4 is a system and network diagram that shows an illustrative operating environment that includes a service provider network that can be configured to implement aspects of the functionality described herein.

FIG. 4 is a system and network diagram that shows one illustrative operating environment for the configurations disclosed herein that includes a service provider network 102 that can be configured to execute the storage service 100, the storage analytics service 118, and the other network services described herein, according to one particular configuration. As discussed briefly above, the service provider network 102 can execute network services that provide computing resources on a permanent or an as-needed basis. Among other types of functionality, the computing resources provided by the service provider network 102 can be utilized to implement the various network services described herein. As also discussed above, the computing resources provided by the service provider network 102 can be data storage resources, data processing resources, such as VM instances, networking resources, data communication resources, network services, and other types of resources.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 are enabled in one implementation by one or more data centers 404A-404D (which might be referred to herein singularly as "a data center 404" or collectively as "the data centers 404"). The data centers 404 are facilities utilized to house and operate computer systems and associated components. The data centers 404 typically include redundant and backup power, communications, cooling, and security systems. The data centers 404 can also be located in geographically disparate locations. One illustrative configuration for a data center 404 that can be utilized to implement the technologies disclosed herein will be described below with regard to FIG. 5.

The users of the service provider network 102 can access the computing resources provided by the service provider network 102 over a network 402, which can be a wide area communication network ("WAN"), such as the Internet, an intranet or an Internet service provider ("ISP") network or a combination of such networks. For example, and without limitation, a computing device 104 operated by a user of the service provider network 102 can be utilized to access the service provider network 102 by way of the network 402. It should be appreciated that a local-area network ("LAN"), the Internet, or any other networking topology known in the art that connects the data centers 404 to remote customers and other users can be utilized. It should also be appreciated that combinations of such networks can also be utilized.

Figure 5:
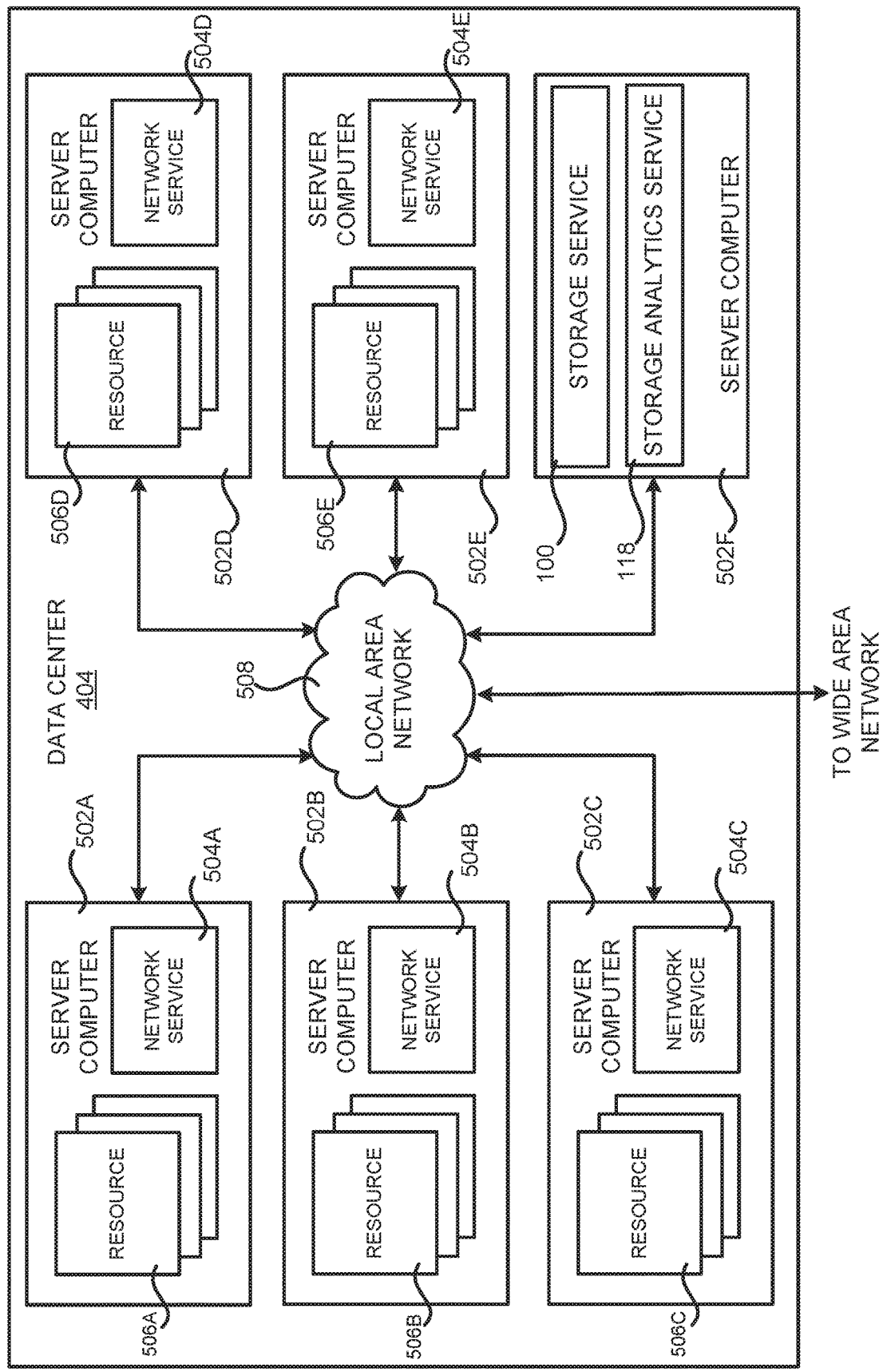
FIG. 5 is a computing system diagram illustrating a configuration for a data center that can be utilized to implement aspects of the technologies disclosed herein.

FIG. 5 is a computing system diagram that illustrates one configuration for a data center 404 that can be utilized to implement the storage service 100, the storage analytics service 118, and the other network services disclosed herein. The example data center 404 shown in FIG. 5 includes several server computers 502A-502E (which might be referred to herein singularly as "a server computer 502" or in the plural as "the server computers 502") for providing the computing resources 506A-506E, respectively.

The server computers 502 can be standard tower, rack-mount, or blade server computers configured appropriately for providing the various computing resources described herein (illustrated in FIG. 5 as the computing resources 506A-506E). As mentioned above, the computing resources 506 provided by the service provider network 102 can be data storage resources, data processing resources such as VM instances or hardware computing systems, database resources, networking resources, and others. Some of the servers 502 can also be configured to execute network services 504A-504E capable of instantiating, providing and/or managing the computing resources 506, some of which are described in detail herein.

The data center 404 shown in FIG. 5 also includes a server computer 502F that can execute some or all of the software components described above. For example, and without limitation, the server computer 502F can be configured to execute the storage service 100 and the storage analytics service 118, both of which were described in detail above. The server computer 502F can also be configured to execute other components and/or to store data for providing some or all of the functionality described herein. In this regard, it should be appreciated that components or different instances of the storage service 100 and the storage analytics service 118 can execute on many other physical or virtual servers in the data centers 404 in various configurations.

In the example data center 404 shown in FIG. 5, an appropriate LAN 508 is also utilized to interconnect the server computers 502A-502F. The LAN 508 is also connected to the network 402 illustrated in FIG. 4. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 404A-404D, between each of the server computers 502A-502F in each data center 404, and, potentially, between computing resources 506 in each of the data centers 404. It should be appreciated that the configuration of the data center 404 described with reference to FIG. 5 is merely illustrative and that other implementations can be utilized.

Figure 6:
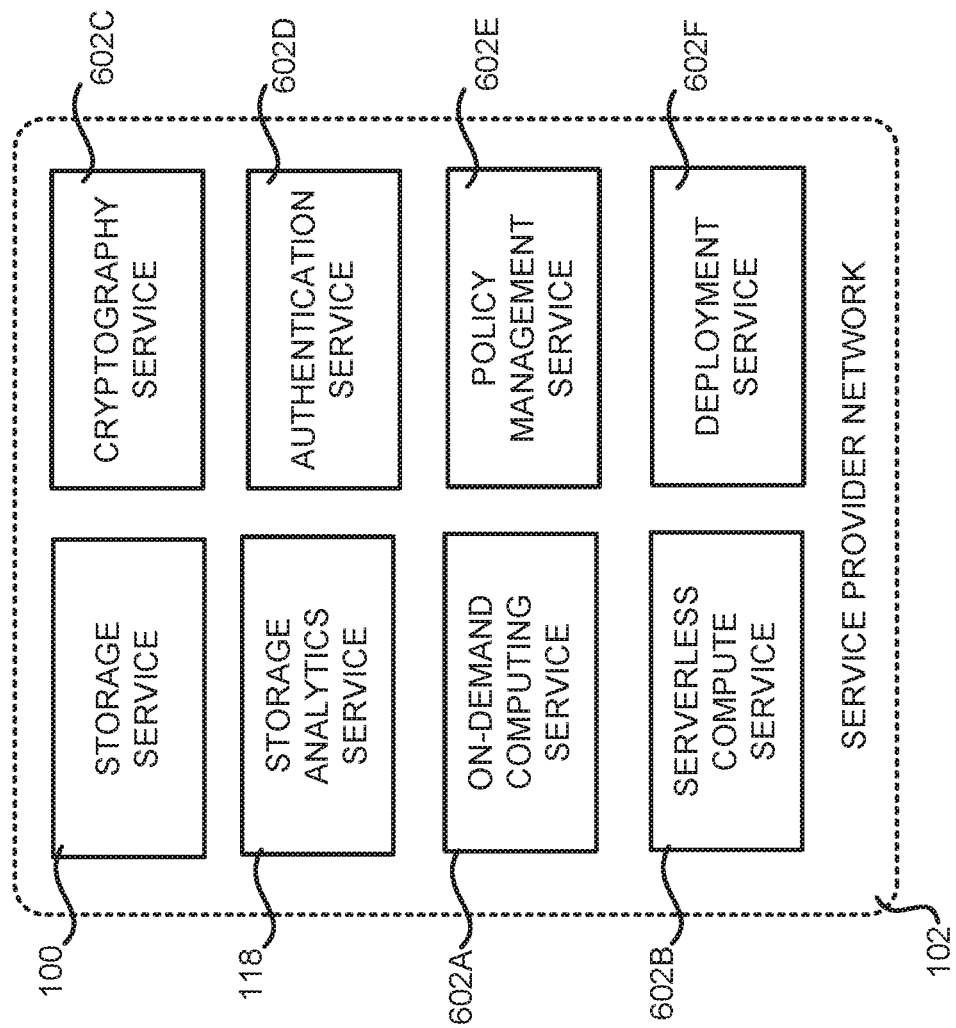
FIG. 6 is a network services diagram that shows aspects of several services that can be provided by and utilized within a service provider network configured to implement the various technologies disclosed herein.

FIG. 6 is a system and network diagram that shows aspects of several network services that can be provided by and utilized within a service provider network 102 in one configuration disclosed herein. In particular, and as discussed above, the service provider network 102 can provide a variety of network services to customers and other users of the service provider network 102 including, but not limited to, the storage service 100, the storage analytics service 118, an on-demand computing service 602A, a serverless compute service 602B, a cryptography service 602C, an authentication service 602D, a policy management service 602E, and a deployment service 602F. The service provider network 102 can also provide other types of network services, some of which are described below.

It is to be appreciated that users of the service provider network 102 can include organizations or individuals that utilize some or all of the network services provided by the service provider network 102. As described above, users such as the user 120 can communicate with the service provider network 102 using an appropriate computing device 104 through a network, such as the network 402 shown in FIG. 4.

It is also noted that not all configurations described include the network services shown in FIG. 6 and that additional network services can be provided in addition to, or as an alternative to, the services explicitly described herein. Each of the services shown in FIG. 6 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other (e.g., to enable a VM provided by the on-demand computing service 602A to store data in or retrieve data from the storage service 100). Additional details regarding some of the services shown in FIG. 6 will now be provided.

The on-demand computing service 602A can be a collection of computing resources configured to instantiate VM instances and to provide other types of computing resources 506 on demand. For example, a user of the service provider network 102 can interact with the on-demand computing service 602A (via appropriately configured and authenticated API calls, for example) to provision and operate VM instances that are instantiated on physical computing devices hosted and operated by the service provider network 102. The VM instances can be used for various purposes, such as to operate as servers supporting the network services described herein, a web site, to operate business applications or, generally, to serve as computing resources for the user.

Other applications for the VM instances can be to support database applications, electronic commerce applications, business applications and/or other applications. Although the on-demand computing service 602A is shown in FIG. 6, any other computer system or computer system service can be utilized in the service provider network 102 to implement the functionality disclosed herein, such as a computer system or computer system service that does not employ virtualization and instead provisions computing resources on dedicated or shared computers/servers and/or other physical devices.

The serverless compute service 602B is a network service that allows users to execute code (which might be referred to herein as a "function") without provisioning or managing server computers in the service provider network 102. Rather, the serverless compute service 602B can automatically run code in response to the occurrence of events. The code that is executed can be stored by the storage service 100 or in another network accessible location.

In this regard, it is to be appreciated that the term "serverless compute service" as used herein is not intended to infer that servers are not utilized to execute the program code, but rather that the serverless compute service 602B enables code to be executed without requiring a user to provision or manage server computers. The serverless compute service 602B executes program code only when needed, and only utilizes the resources necessary to execute the code. In some configurations, the user or entity requesting execution of the code might be charged only for the amount of time required for each execution of their program code.

The service provider network 102 can also include a cryptography service 602C. The cryptography service 602C can utilize storage services of the service provider network 102, such as the storage service 100, to store encryption keys in encrypted form, whereby the keys can be usable to decrypt user keys accessible only to particular devices of the cryptography service 602C. The cryptography service 602C can also provide other types of functionality not specifically mentioned herein.

As illustrated in FIG. 6 and discussed above, the service provider network 102, in various configurations, also includes an authentication service 602D and a policy management service 602E. The authentication service 602D, in one example, is a computer system (i.e., collection of computing resources 506) configured to perform operations involved in authentication of users. For instance, one of the services shown in FIG. 6 can provide information from a user to the authentication service 602D to receive information in return that indicates whether or not the requests submitted by the user are authentic.

The policy management service 602E, in one example, is a network service configured to manage policies on behalf of users of the service provider network 102. The policy management service 602E can include an interface (e.g. API or GUI) that enables customers to submit requests related to the management of policy, such as a security policy. Such requests can, for instance, be requests to add, delete, change or otherwise modify policy for a customer, service, or system, or for other administrative actions, such as providing an inventory of existing policies and the like.

The service provider network 102 can additionally maintain other network services based, at least in part, on the needs of its customers. For instance, the service provider network 102 can maintain a deployment service 602F for deploying program code in some configurations. The deployment service 602F provides functionality for deploying program code, such as to virtual or physical hosts provided by the on-demand computing service 602A. Other services include, but are not limited to, database services, object-level archival data storage services, and services that manage, monitor, interact with, or support other services. The service provider network 102 can also be configured with other network services not specifically mentioned herein in other configurations.

Figure 7:
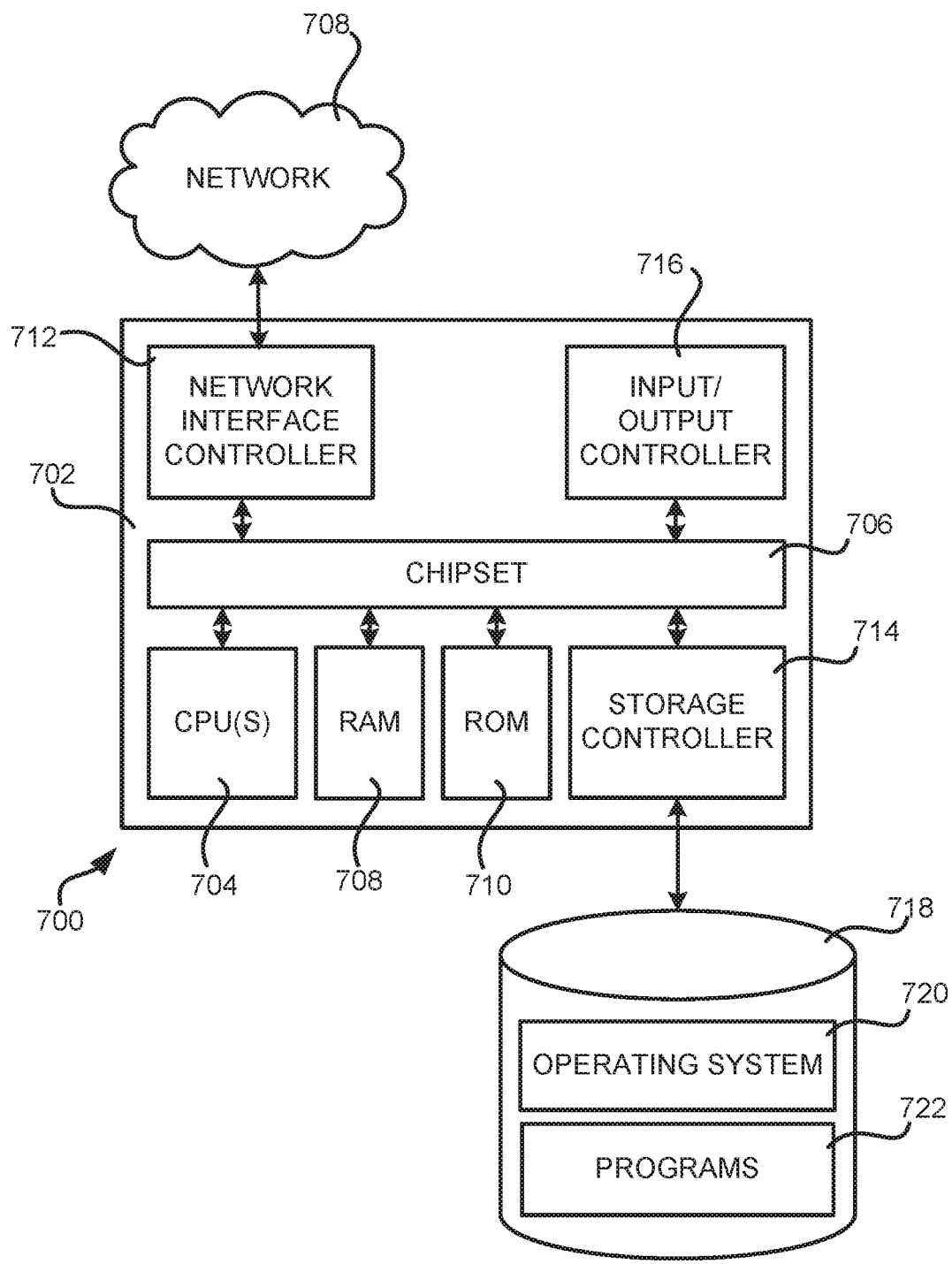
FIG. 7 is a computer architecture diagram showing an illustrative computer hardware architecture for implementing a computing device that can be utilized to implement aspects of the various technologies presented herein.

FIG. 7 shows an example computer architecture for a computer 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 708. The chipset 706 can include functionality for providing network connectivity through a NIC 712, such as a gigabit Ethernet adapter. The NIC 712 is capable of connecting the computer 700 to other computing devices over the network 708. It should be appreciated that multiple NICs 712 can be present in the computer 700, connecting the computer to other types of networks and remote computer systems.

The computer 700 can be connected to a mass storage device 718 that provides non-volatile storage for the computer. The mass storage device 718 can store an operating system 720, programs 722, and data, which have been described in greater detail herein. The mass storage device 718 can be connected to the computer 700 through a storage controller 714 connected to the chipset 706. The mass storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the mass storage device 718 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 718 is characterized as primary or secondary storage, and the like.

For example, the computer 700 can store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the mass storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 718 can store an operating system 720 utilized to control the operation of the computer 700. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 718 can store other system or application programs and data utilized by the computer 700.

In one configuration, the mass storage device 718 or other computer-readable storage media is encoded with computer-executable instructions which, when loaded into the computer 700, transform the computer from a general-purpose computing system into a special-purpose computer capable of implementing the configurations described herein. These computer-executable instructions transform the computer 700 by specifying how the CPUs 704 transition between states, as described above. According to one configuration, the computer 700 has access to computer-readable storage media storing computer-executable instructions which, when executed by the computer 700, perform the various processes described above with regard to FIGS. 1-3. The computer 700 can also include computer-readable storage media for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or can utilize an architecture completely different than that shown in FIG. 7.

Based on the foregoing, it should be appreciated that technologies for providing a network service capable of identifying infrequently accessed data from a request stream have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. An apparatus, comprising:
one or more processors; and
at least one non-transitory computer-readable storage medium having instructions stored thereupon which, when executed by the one or more processors, cause the apparatus to:
receive a request at one or more devices of a network service for data identifying an estimate of a number of infrequently accessed objects of a plurality of objects stored by the network service having associated access rates that are less than a threshold value;
execute a streaming algorithm to generate an estimate of frequently accessed objects of the plurality of objects based at least in part on metadata describing a stream of accesses of the plurality of objects, the frequently accessed object being associated with access rates that are greater than or equal to the threshold value;
generate, at the network service, a statistical distribution of the frequently accessed objects based at least in part on the estimate of the frequently accessed objects;
generate, at the network service, the estimate of the number of infrequently accessed objects based at least in part on the statistical distribution and an indication of a total number of the plurality of objects;
based at least in part on generating the estimate of the number of infrequently accessed objects:
return a response to the request indicating the estimate of the number of infrequently accessed objects;
identify at least one of the infrequently accessed objects stored in a first storage tier of the network service; and
at least one of:
migrate the at least one of the infrequently accessed objects from being stored in the first storage tier to a second storage tier of the network service, wherein the second storage tier consumes less resources to store objects than the first storage tier; or
delete the at least one of the infrequently accessed objects from being stored in the first storage tier of the network service.

2. The apparatus of claim 1, wherein the request comprises the threshold value.

3. The apparatus of claim 1, wherein the streaming algorithm comprises a heavy hitters algorithm.

4. The apparatus of claim 1, wherein the at least one non-transitory computer-readable storage medium has further instructions stored thereupon to:
utilize machine learning to identify correlations between access rates for the plurality of objects and one or more object attributes;
identify object attributes correlated to an access rate that is less than the threshold value; and
return the identified object attributes in the response to the request.

5. The apparatus of claim 4, wherein the one or more object attributes comprise one or more of an object type, an object storage location, a user agent string, an object age, an object size, an object name, or user-supplied metadata.

6. A computer-implemented method, comprising:
executing a streaming algorithm to identify frequently accessed objects among a plurality of objects, the frequently accessed objects having associated access rates greater than a threshold value;
generating a statistical distribution for the frequently accessed objects among the plurality of objects;
generating an estimate of a number of infrequently accessed objects among the plurality of objects based at least in part upon the statistical distribution, the infrequently accessed objects having associated access rates less than the threshold value;
identifying at least one of the infrequently accessed objects stored in a first storage tier of a network service; and
at least one of:
migrating at least one of the infrequently accessed objects to a first storage tier of the network service, wherein the first storage tier consumes less resources to store objects than a second storage tier; or
deleting the at least one of the infrequently accessed objects from being stored in the first storage tier of the network service.

7. The computer-implemented method of claim 6, further comprising receiving a request at a network service for the estimate of the number of infrequently accessed objects among the plurality of objects, wherein the request comprises the threshold value.

8. The computer-implemented method of claim 6, wherein the plurality of objects are stored by a network storage service, and wherein the frequently accessed objects among the plurality of objects are identified based at least in part on metadata describing a stream of accesses of the plurality of objects stored by the network storage service.

9. The computer-implemented method of claim 6, wherein the estimate of the number of the infrequently accessed objects is further based at least in part on a total number of objects among the plurality of objects.

10. The computer-implemented method of claim 6, wherein the streaming algorithm comprises a heavy hitters algorithm.

11. The computer-implemented method of claim 6, further comprising:
receiving a request at a network service for the estimate of the number of objects among the plurality of objects that are infrequently accessed;
correlating access rates for the plurality of objects to one or more object attributes;
identifying object attributes that are correlated to an access rate for the infrequently accessed objects of the plurality of objects; and
returning the identified object attributes in a response to the request.

12. The computer-implemented method of claim 11, wherein the one or more object attributes comprise one or more of an object type, an object storage location, a user agent string, an object age, an object size, an object name, or user-supplied metadata.

13. The computer implemented method of claim 6, further comprising identifying the at least one of the infrequently accessed objects stored in the first storage tier of the network service based at least in part on generating the estimate of the number of infrequently accessed objects.

14. A non-transitory computer-readable storage medium having instructions stored thereupon which are executable by a processor and which, when executed, cause the processor to:
- execute a streaming algorithm to identify one or more frequently accessed objects among a plurality of objects stored by a network service, the one or more frequently accessed objects having associated access rate values greater than a threshold value;
- generate, a statistical distribution for the one or more frequently accessed objects among the plurality of objects;
- generate, based at least in part on the statistical distribution, an estimate of a number of infrequently accessed objects among the plurality of objects stored by the network service, the infrequently accessed objects having associated access rate values less than the threshold value; and
- at least one of:
  - migrate one or more of the number of infrequently accessed objects from a first storage location of the network service to a second storage location, wherein the second storage location consumes less resources to store objects than the first storage location; or
  - delete the one or more of the number of infrequently accessed objects from being stored by the network service.

15. The non-transitory computer-readable storage medium of claim 14, wherein the request comprises the threshold value.

16. The non-transitory computer-readable storage medium of claim 14, wherein the network service comprises a network storage service, and wherein the frequently accessed objects among the plurality of objects are identified based, at least in part, on metadata describing a stream of accesses of the plurality of objects stored by the network storage service.

17. The non-transitory computer-readable storage medium of claim 14, wherein the first storage location comprises a first storage service and the second storage location comprises a second storage service.

18. The non-transitory computer-readable storage medium of claim 14, having further instructions stored thereupon to:
- correlate access rates for the plurality of objects to one or more object attributes;
- identify object attributes that are correlated to an access rate for the infrequently accessed objects of the plurality of objects; and
- return the identified object attributes in response to a request.

19. The non-transitory computer-readable storage medium of claim 14, having further instructions stored thereupon to identify the one or more of the number of infrequently accessed objects to be migrated or deleted based at least in part on generating the estimate of the number of infrequently accessed objects.

20. The non-transitory computer-readable storage medium of claim 14, wherein the first storage location of the network service comprises a first storage tier of the network service, and wherein the second storage location comprises a second storage tier of the network service.

* * * * *